(12) United States Patent
Butcher

(10) Patent No.: US 8,331,760 B2
(45) Date of Patent: Dec. 11, 2012

(54) ADAPTIVE VIDEO ZOOM

(75) Inventor: Thomas Butcher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/792,485

(22) Filed: Jun. 2, 2010

(65) Prior Publication Data

US 2011/0299832 A1    Dec. 8, 2011

(51) Int. Cl.
*H04N 9/80*      (2006.01)
*H04N 5/93*      (2006.01)
*H04N 5/92*      (2006.01)
*G11B 27/00*      (2006.01)
*G06K 9/42*      (2006.01)
*G06K 9/44*      (2006.01)
*G06K 9/36*      (2006.01)
*G06K 9/32*      (2006.01)

(52) U.S. Cl. ........ 386/239; 386/242; 386/278; 386/282; 386/280; 386/286; 386/326; 386/353; 382/256; 382/291; 382/276; 382/293; 382/295; 382/298

(58) Field of Classification Search ................. 386/239, 386/242, 278, 282, 280, 286, 326, 353; 382/256, 382/291, 276, 293, 295, 298
See application file for complete search history.

(56) References Cited

U.S. PATENT DOCUMENTS

| | | | |
|---|---|---|---|
| 5,598,209 A | | 1/1997 | Cortjens et al. |
| 6,573,907 B1 * | | 6/2003 | Madrane .................... 715/719 |
| 6,771,306 B2 * | | 8/2004 | Trajkovic et al. ............. 348/170 |
| 6,798,977 B2 * | | 9/2004 | Maeda .......................... 386/341 |
| 7,423,669 B2 * | | 9/2008 | Oya et al. .................. 348/208.14 |
| 7,720,258 B1 * | | 5/2010 | Ullmann ........................ 382/103 |
| 7,978,936 B1 * | | 7/2011 | Casillas et al. ................ 382/305 |
| 2009/0113278 A1 | | 4/2009 | Denoue et al. |
| 2009/0128647 A1 | | 5/2009 | Fahn et al. |
| 2009/0245600 A1 | | 10/2009 | Hoffman et al. |

OTHER PUBLICATIONS

Mavlankar, et al., "Video Streaming with Interactive Pan/Tilt/Zoom", Retrieved at <<http://www.stanford.edu/~bgirod/pdfs/Mavlankar_Girod_Chapter_Oct09.pdf>>, 2009, pp. 1-26.

Lavigne, et al., "Automatic Video Zooming for Sport Team Video Broadcasting on Smart Phones", Retrieved at <<http://www.multitel.be/image/public/pdf/2010_VISAPP_WALCOMO.pdf>>, International Conference on Computer Vision Theory and Applications, 2010, pp. 7.

(Continued)

*Primary Examiner* — Daquan Zhao
(74) *Attorney, Agent, or Firm* — Alleman Hall McCoy Russell & Tuttle LLP

(57) ABSTRACT

Adaptive video zoom is provided by a method of providing a video content item for viewing by one or more viewers. The method includes identifying one or more objects within the video content item. The method further includes, for each identified object, assigning a searchable descriptor for the object, creating a time stamp indicating one or more time periods within the video content item during which the object occurs, and creating a bounding window defining a region of the video content item within which the object occurs. The searchable descriptor, time stamp, and bounding window are then packaged into metadata associated with the video content item. The method further includes delivering the video content item and the metadata associated with the video content item to a client computing device.

20 Claims, 7 Drawing Sheets

OTHER PUBLICATIONS

Mavlankar, et al., "Region-of-Interest Prediction for Interactively Streaming Regions of High Resolution Video", Retrieved at <<http://www.stanford.edu/~divad/projects/Mavlankar_07EE392J_ROIPrediction.pdf >>, Proceedings of 16th IEEE International Packet Video Workshop, Nov. 2007, pp. 1-13.

Khiem, et al., "Supporting Zoomable Video Streams with Dynamic Region-of-Interest Cropping", Retrieved at <<http://www.comp.nus.edu.sg/~ooiwt/papers/zoom-mmsys10-final.pdf >>, International Multimedia Conference, Proceedings of the first annual ACM SIGMM conference on Multimedia systems, Feb. 22-23, 2010, pp. 259-270.

Kimura, et al., "A Method for Extracting Region of Interest Based on Attractiveness", Retrieved at http://ieeexplore.ieee.org/xpls/abs_all.jsp?arnumber=1649643 >>, IEEE Transactions on Consumer Electronics, vol. 52, No. 2, May 2006, pp. 312-316.

* cited by examiner

| OBJECT | DESCRIPTOR | TIME | WINDOW |
|---|---|---|---|
| ... | ... | ... | ... |
| 23 | PLAYER A | 00:01:12; 01:25:49 | [1324,12] – [1400, 60] |
| 24 | PLAYER B | 01:30:32; 01:35:10 | [900, 1300] – [1020, 1454] |
| 25 | BASKETBALL | 00:30:45; 00:50:55 | [600, 1298] – [750,1303] |
| ... | ... | ... | ... |

```xml
<?xml version="1.0"?>
<video id="D10B93AC-4CB4-42EB-A9F4-2B3354C3658D" lastUpdate="20100428T145900">
  <videoInfo>          ← 92
    <title>Movie A</title>
    <director>John Doe</director>
    <releaseDate>1986</releaseDate>
  </videoInfo>
  <extractedObjects>   ← 94
    <object
      id="0"
      class="face"
      referenceId="7AF81752-2EB9-4FCD-A053-7E76A9D4573C"   ← 95
      icon="http:// exampleaddress1.jpg"
      displayName="Bob Smith"/>
    <object
      id="1"
      class="face"
      referenceId="F9F411A0-AE0B-4CE8-8CF6-05F0CEFDBAF3"
      icon="http:// exampleaddress2.jpg"
      displayName="Mary Johnson"/>
    <object
      id="2"
      class="object"
      referenceId="5B11DCE6-161D-4BD9-B7B4-8179947E8DB9"
      icon="http://exampleaddress3.jpg"
      displayName="Synthesizer"/>
    <!-- etc... -->   ← 96
  </extractedObjects>
  <objectRegistrations>   ← 98
    <registration>
      <objectId="0"/>
      <timespan>
        <begin>00:02:55.2</begin>
        <end>00:04:55.29</end>
      </timespan>
      <zoomWindow>
        <left>300</left>
        <top>129</top>
        <right>409</right>
        <bottom>700</bottom>
      </zoomwindow>
    </registration>
    <!-- etc... -->   ← 99
  </objectRegistrations>
</video>
```

ADAPTIVE VIDEO ZOOM

BACKGROUND

Different display devices may be configured to display video content at different display resolutions. Further, the video itself may be any of a variety of possible resolutions. Thus, it may be difficult to display video of a higher resolution (e.g., high-definition video) on a smaller display, such as that of a mobile communication device. One approach is then to lower the resolution of the video to a resolution capable of being displayed by the mobile communication device; however, the viewer may no longer be able to clearly see items in the video given the lower resolution and small size of the display. Another approach is to view a portion of the video in a zoomed view. However, items of interest on the screen are typically not stagnant within the frame, thus it may be cumbersome for the viewer to continually adjust which portion of the video they desire to view. Furthermore, when watching extremely high resolution video, the viewer may wish to focus on specific subregions of the video stream even on output devices with large screens.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, a method of providing a video content item for viewing by one or more viewers is provided. The method includes identifying one or more objects within the video content item. The method further includes, for each identified object, assigning a searchable descriptor for the object, creating a time stamp indicating one or more time periods within the video content item during which the object occurs, and creating a bounding window defining a region of the video content item within which the object occurs. The searchable descriptor, time stamp, and bounding window are then packaged into metadata associated with the video content item. The method further includes delivering the video content item and the metadata associated with the video content item to a client computing device.

BRIEF DESCRIPTION OF THE DRAWINGS

FIG. 5 shows another example of metadata associated with a video content item in accordance with an embodiment of the present disclosure.

DETAILED DESCRIPTION

Video content may be displayed on a computing device so as to provide a zoomed view of the content, allowing a user (e.g. a viewer) to view objects of interest (e.g., people, sport items, cars, etc.) within the video despite constraints of the display, such as a smaller display configured to display content with a relatively small number of pixels. As such, a viewer may interact with the computing device to choose a preferred focal point for a given stream. However, such objects of interest typically are not stagnant within the frame, or the item of focus on a screen may shift from one point to another. As such, a viewer may physically interact with the playback device to change the focal window, which may be cumbersome to the viewer and interrupt the viewing experience.

Thus adaptive video zoom as described herein applies visual and/or auditory scene analysis techniques to automatically extract points of interest from the stream itself. Thus, objects can be identified in video content items, such as a moving automobile, a human face, etc. Using these techniques, automatic zoom and pan windows may be defined and may be provided with the video content item. A playback device may then display a zoomed view based on such information, as described in more detail hereafter.

Figure 1:
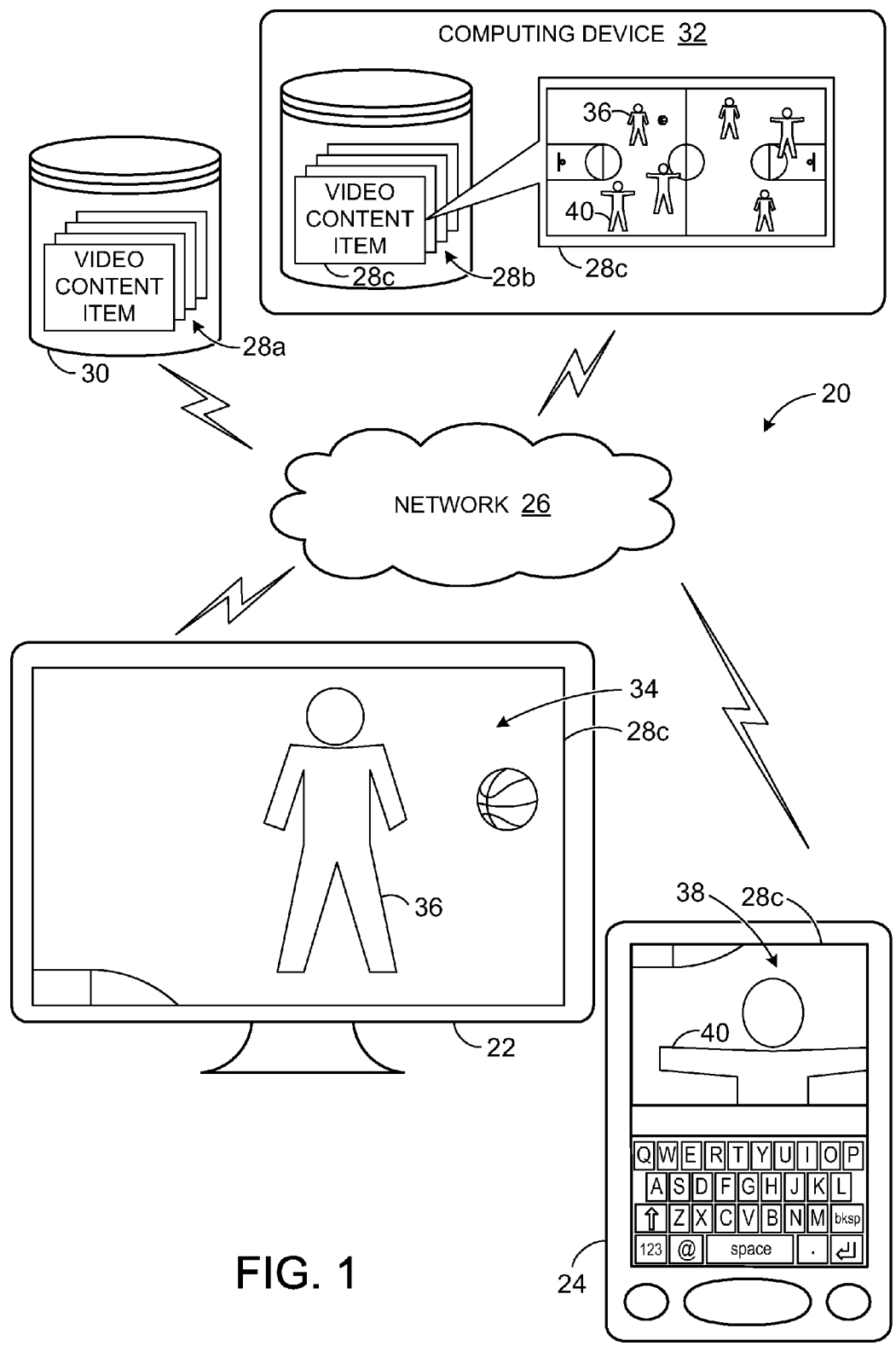
FIG. 1 schematically shows an example computing environment for providing and viewing video content items in accordance with embodiments of the present disclosure.

FIG. 1 shows an example computing environment 20 for providing and viewing video content items. Example client computing devices (e.g., clients) 22 and 24 are configured to playback video content items. Examples of such client computing devices may include, but are not limited to, televisions, personal computers, set-top boxes, game consoles, mobile communication devices, etc. Video content items may be stored locally at the client and/or may be stored remotely. As an example, a client may receive content from local storage such as a data-holding subsystem of the client. As another example, a client may receive content such as video content items 28a and/or 28b from remote storage such as a remote storage location 30 and/or a network-accessible computing device (e.g., server) 32 over a network such as a network 26. As yet another example, content may be received from remote storage and may then be uploaded to the client for subsequent playback from a client copy of the content item. As yet another example, content may be stored and accessed locally at the client computing device. Further, network 26 may be any suitable network including but not limited to the Internet, a cable television network, a satellite television network, a cellular network, etc.

In the depicted example, an example video content item 28c stored on server 32 may be delivered to one or more clients such as client 22 and/or client 24. Further, as will be described in more detail with reference to FIG. 2, server 32 may be configured to identify objects occurring within video content item 28c, and provide information about such objects within metadata provided to the client with video content item 28c. As such, a client can then display video content item 28c in a zoomed view based on this information. In this way, each client may be configured to zoom video content item 28c according to display parameters of the device and/or zoom preferences of a viewer.

As an example, in the depicted scenario, video content item 28c is video of a basketball game. Example client 22 (e.g., a television) may display a zoomed view 34 of a player 36 within video content item 28c. However, another client computing device such as client 24 (e.g., a mobile communication device) may display a different zoomed view 38 of the same video content item 28c, which displays player 40. As such, different viewers having different devices may view different zoomed views of the same video content item, allowing each viewer to view a particular object within the video that is of interest.

In this way, server 32 need not package content individualized for each viewer and/or device. Rather server 32 can provide the same content item and the same associated metadata to all clients, and the client itself can utilize the metadata to provide a zoomed view individualized for a viewer of that client. In some embodiments, the client may determine which object within the video content item is an object of interest to be displayed in a zoomed view. However, in some embodiments, a list of such objects may be provided to the viewer, allowing the viewer to select an object of interest.

Further, in some embodiments, computing environment 20 may be a home environment, wherein network 26 is a home network, and server 32 is a home server, set-top box, etc. configured to provide video content items to client 22 and/or client 24.

Further yet, in some embodiments, a client may be configured to identify objects occurring within locally-stored video content items. In such a case, the client itself can create information about such objects within metadata, and then use this information to provide zoomed views. As such, the client need not receive the information about the video content item from a remote server. Further, if the zoom preferences are also stored locally at the client, then the client need not access the network entirely.

Figure 2:
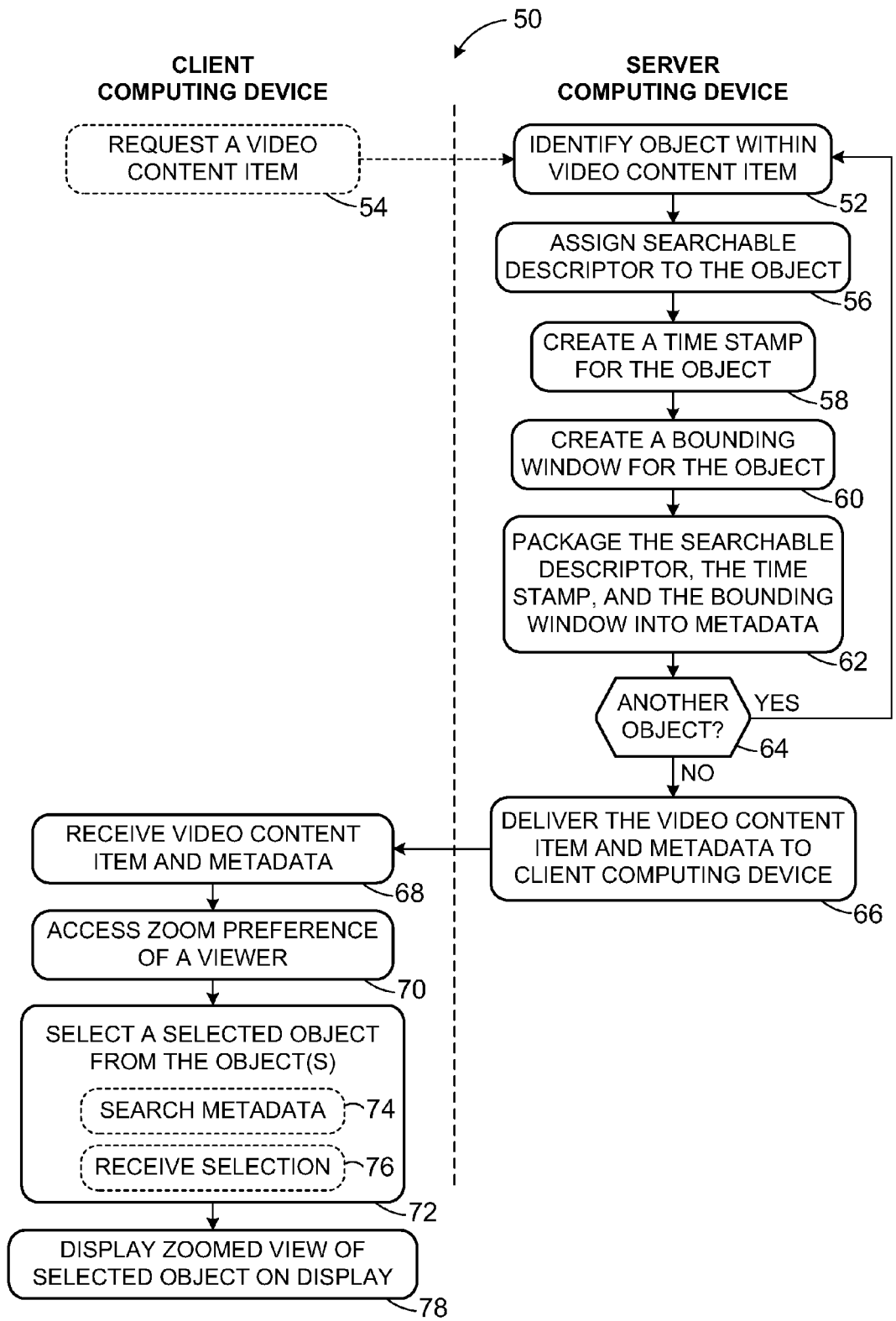
FIG. 2 shows an example flow diagram illustrating an example method of providing and viewing a video content item in accordance with embodiments of the present disclosure.

Turning now to FIG. 2, FIG. 2 illustrates a flow diagram 50 of a method of providing and viewing zoomed video content. It should be appreciated that although flow diagram 50 illustrates operations of a server and client, in some embodiments, a single computing device may be configured to perform operations of both the server and the client.

At 52, the server may identify one or more objects within the video content item. The video content item may be any suitable video content item including but not limited to television programming, movies, on-demand programming, Internet video, etc. In some embodiments, the server may optionally receive a request from a client for the video content item, as indicated at 54. However, in other embodiments, the server may prepare and provide the video content item without receiving such a request (e.g., push the video content item to the client).

The objects identified within the video content item may be any suitable objects of interest, such as actors, athletes, objects, product placements, logos, etc. The server may be configured to identify such objects in any suitable manner. For example, the server may be configured to perform computational scene analysis on video streams that are offered to the viewer for viewing. Such scene analysis may utilize any suitable technique such as object recognition, face recognition, speech/video analysis to identify speakers in a conversation, etc. For example, a facial recognition algorithm may be applied to scenes of a video content item to identify people within each scene such as actors, athletes, celebrities, politicians, etc. As another example, an object recognition algorithm may be applied to scenes of a video content item to identify objects within each scene such as a basketball, a dog, a guitar, a box of cereal, etc. As yet another example, a logo recognition algorithm may be applied to scenes of a video content item to identify logos within each scene such as corporate logos, product brand logos, sports team logos, etc. It is to be understood that any suitable object recognition algorithm may be used without departing from the scope of this disclosure. Further, in some embodiments, objects may be manually detected, verified, and/or labeled instead of, or in addition to, being detected and labeled by automatic algorithms.

Once an object is identified within a video content item, the server may store information about the object, such as where each object appears within the frame, the time at which the object is present in the specified location in the stream, etc.

Accordingly, at 56, the server may assign a searchable descriptor for the object. The searchable descriptor may include any suitable information for identifying the object, such as a searchable name. For example, a searchable descriptor for a public figure might include that person's proper name, nickname, etc. As another example, a globally unique identifier or other identifier may be used to differentiate one object from other objects.

At 58, the server may create a time stamp indicating time period(s) within the video content item during which the object occurs. The time stamp may be in any suitable format. For example, if an actor of interest appears in three scenes of a video content item, the time stamp may include data indicating the beginning and ending times of each of the three relevant scenes.

At 60, the server may create a bounding window defining a region of the video content item within which the object occurs, such as a region of a frame of the video content item. The bounding window may have any suitable shape. For example, the shape of the bounding window may be dependent on a shape of the object. As an example, the bounding window may be in the shape of a circle defined by a centroid and a radius. As another example, the bounding window may be in the shape of a rectangle defined by two or more rectangular coordinates, such as an upper-left coordinate and a lower-right coordinate. As another example, the bounding window may be an irregular shape generally following an outline of the object of interest. Further, the shape may be dependent on a resolution of encoded video and the time at which the objects appear within the video. As such, the shape of the bounding window may change over time. In this way, the bounding window may indicate a zooming level for displaying the object. In other words, a client may utilize the bounding window information in providing a zoomed view of that object, as described in more detail hereafter.

Figures 3, 4:
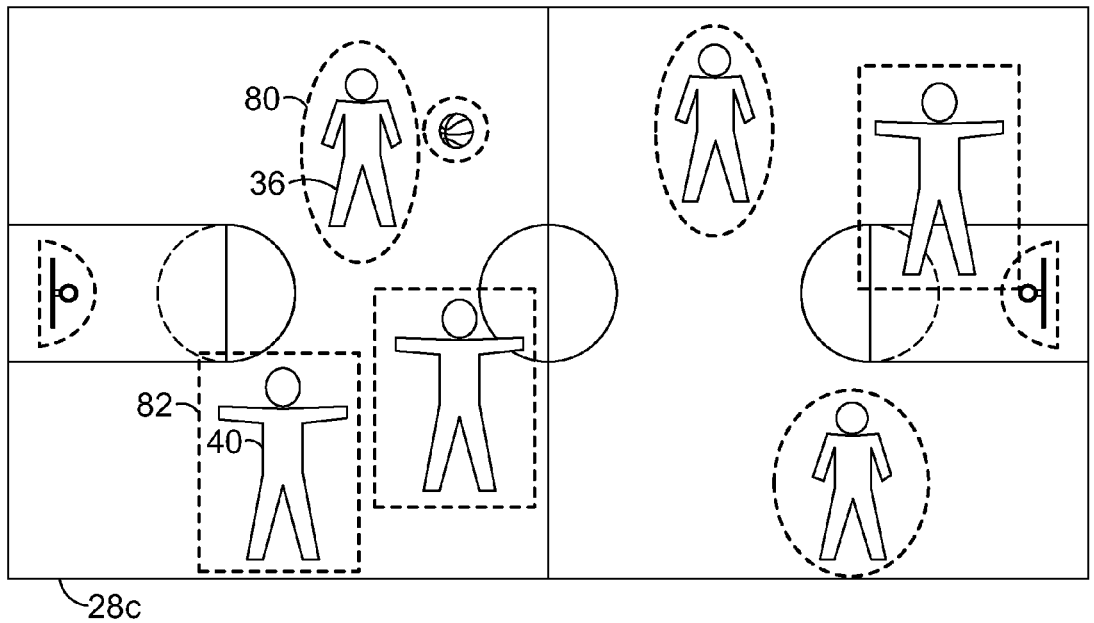
FIG. 3 schematically shows an example of creating bounding windows in accordance with an embodiment of the present disclosure.
FIG. 4 schematically shows an example of metadata associated with a video content item in accordance with an embodiment of the present disclosure.

FIG. 3 illustrates an example of creating bounding windows for example video content item 28c of FIG. 1. In the depicted frame, six basketball players are identified and bounding windows are created for each player, including bounding window 80 corresponding to player 36 and bounding window 82 corresponding to player 40. Further indentified within the depicted frame are both baskets, as well as the basketball.

In the case that the client is configured to also perform the duties of the server, packaging of metadata regarding identified objects and bounding windows could either be done out of band (e.g., before the video is delivered) or it could be done while the video is watched. In the latter case, the local service would continuously process incoming video while it is being watched, so that extracted features could be stored locally. In this way, "smart zoom rewind" scenarios could occur, wherein a user could choose to view a zoomed-in facial expression during a scene. As another example, the client may buffer the video and introduce a slight delay in order to present the user with identified objects before they appear in the video.

Returning to FIG. 2, at 62, the server may package the searchable descriptor, the time stamp, and the bounding window into metadata associated with the video content item. In this way, the server can store a list of potential items of interest for each scene in a stream. As will be described in more detail hereafter, each processed video stream available to a client from the server may have this metadata available. In this way, the metadata may facilitate zoomed viewing of selected object(s) within the video content item. For example, where possible, the items of interest may be matched against a master identity/object list to identify unique objects, such as people or places.

As an example, FIG. 4 illustrates a schematic depiction representing metadata 84 associated with video content item 28c of FIG. 1. Metadata 84 may include information for each identified object within video content item 28c, such as the players, basketball, hoops, etc. It should be appreciated that such a schematic depiction is nonlimiting. The metadata itself may be formatted in any suitable manner using any appropriate data structure.

As another example, the metadata may be packaged into extensible markup language (XML) data. FIG. 5 illustrates an example portion of metadata 90 associated with an example video content item Movie A. As depicted at 92, "videoInfo" may be utilized to describe the video content item, and may include, for example, a title, director, release date, etc.

As depicted at 94, the "extractedObjects" node may be utilized to describe the list of objects identified in the video stream. For each identified object, there may be an ID that identifies this object throughout the stream. Further, a class attribute may tell the computing device what type of object it is. The valid types for each object may be arbitrary, depending on the content. For example, in the case of movies, object types may include faces and objects. However, in the case of travel videos, object types may include places, churches, transit, and other such classes. The domain of classes may not be fixed, but rather may be driven ontologically by the technology used to identify the objects coupled with the application of zoom technology to a domain.

Further, a "referenceId" field (e.g., a searchable descriptor) such as example referenceId field 95 may be used to link objects identified in this stream to objects identified in other streams. For example, another stream may include "Bob Smith," in which case the objects with his face may be identified by the same referenceId value (e.g., 7AF81752-2EB9-4FCD-A053-7E76A9D4573C). The attributes icon and displayName may be used to present the viewer with choices in a user interface. It should be appreciated that although a few objects are shown in the extractedObjects node, all objects identified within the video content item may be described here, as indicated by the "etc." comment at 96.

As depicted at 98, the "objectRegistrations" node may be used to track all instances of objects identified within the stream as well as their zoom information. Each registration may refer to a single object and may have an associated time span which denotes when this registration is present within the video stream. Finally, each registration may also provide a bounding window of the identified object so that the client may automatically zoom to the object identified in the registration. When the time span elapses, the client may be configured to either zoom into another registered object, or if none are selected, exit a zoom mode and then display full video. It should be appreciated that although a few object registrations are shown in the objectRegistrations node, all instances associated with objects identified within the video content item may be described here, as indicated by the "etc." comment at 99.

Returning to FIG. 2, at 64, the server determines if there are more objects within the video content item to identify and classify. If so, flow proceeds to 52. If there are no other objects within the video content item to classify, then flow proceeds to 66.

At 66, the server may deliver the video content item and the metadata associated with the video content item to a client computing device. As introduced above, in some embodiments the video content item may be delivered in response to a request from the client, such as indicated at 54. However, in other embodiments, the server may prepare and provide the video content item without receiving such request (e.g., push the video to the client).

The metadata may be delivered with the video content item in any suitable manner. For example, in some embodiments, the metadata may be encoded as part of the video content item. However, in other embodiments, the metadata may be a companion file distinct from the video content item or header data packaged with the video data.

Since the metadata is provided in addition to the video content item, the lists of identified objects from a video stream as determined by the server may be made available to the client upon receipt. In this way, the video content item may be configured for viewing by one or more viewers. The server can provide the same content item and the same associated metadata to all clients, and the client itself can utilize the metadata to provide a zoomed view individualized for a viewer of that client.

At 68, the client may receive the video content item and metadata associated with the video content item from the server. As introduced above, the metadata includes the searchable descriptor, time stamp, and bounding window for each object identified within the video content item. The client may then stream the video content item and/or save the video content item for playback at a later time.

In order to determine which object within the video content item may be of interest to the viewer, at 70, the client may access a zoom preference of a viewer which indicates object(s) to zoom during video playback. The zoom preference may include zoom preferences determined in any suitable manner. For example, in some embodiments, the zoom preference may include zoom preferences identified by the viewer. For example, a viewer interested in guitar solos may indicate within her zoom preferences to provide a zoomed view of a guitar when it appears within a video content item (e.g., music videos, concerts, etc.). As another example, a viewer having a favorite athlete may indicate within his zoom preferences to provide a zoomed view of that athlete when that athlete appears within a video content item (e.g., a sports game, an interview, a commercial, a cameo appearance within a movie, etc.).

Additionally or alternatively, the zoom preference may include learned zoom preferences derived from past viewing habits. For example, a computing device may track viewer behavior (e.g., viewing habits, media consumption, etc.) to determine which objects a viewer tends to watch frequently and/or for extended durations. The computing device may then analyze this behavior to determine zoom preferences for the viewer. For example, if the viewer tends to watch movies with a particular actor, the computing device may determine that this actor may be an object of interest to the viewer.

Further, the zoom preference may be stored in any suitable location, such as locally at the client and/or in network-accessible data storage. Accordingly, for the case of the former, accessing the zoom preference may include accessing the local storage (e.g., data-holding subsystem) of the client. In such cases, where the viewer preferences are implemented locally based on general metadata provided to different client devices, the viewer may be able to maintain privacy by not sharing zoom preferences with the server. However, for the case of the latter, accessing the zoom preference may include accessing the storage (e.g., data-holding subsystem) of the server via a network connection. Zoom preferences stored in network-accessible storage may offer more flexibility to a viewer, in that their preferences may be accessed by whatever client device they are currently utilizing, rather than having the preferences tied to a particular client device.

At 72, the client may select a selected object from the identified object(s). In some embodiments, this may include searching the metadata for an object indicated by the zoom preference, as indicated at 74. For example, the client may compare the identified objects in the metadata with that of the zoom preference of the viewer, to determine if any of the identified objects in the metadata are of interest to the viewer.

Figure 6:
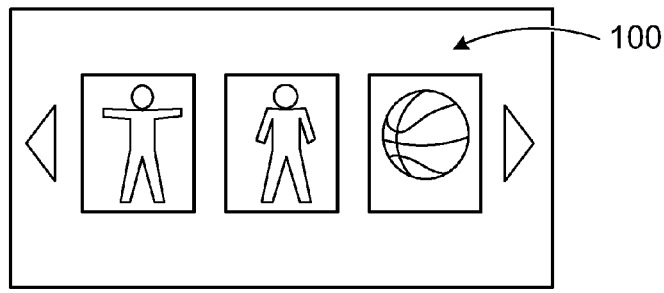
FIG. 6 schematically shows an example of a mosaic view displaying selectable objects in accordance with an embodiment of the present disclosure.

However, in some embodiments, the client may make the object information of the video content item available to the viewer, for example, when the viewer is browsing for videos to watch and/or when the viewer initiates a video stream. By providing a list of such objects to the viewer, the viewer may then select an object of interest. As an example, the client may display a mosaic view which visually presents candidate object(s) that may be zoomed during video playback. In such a case, selecting the selected object may include receiving a user input indicating such a selection, as indicated at 76. FIG. 6 shows an example of a mosaic view 100, presenting a list of selectable objects identified within video content item 28c of FIG. 1.

Further, in some embodiments, a viewer may have already selected an item from another stream that is present in the current stream, in which case, the client may simply choose this item.

Returning to FIG. 2, at 78, the client may display a zoomed view of the selected object on a display of the client computing device. In other words, once an object is selected, the client may focus a display window on the given object. For example, objects may be annotated in the stream with their identifier, screen position, and relative size such that the client may center focus on the object continuously. Further, if multiple objects are selected by the viewer and one object of focus leaves the stream, the focus may then shift to the next object present in the stream.

Further, the zoomed view may visually present the selected object of the video content item based on a bounding window associated with the selected object. For example, the dimensions of the bounding window may indicate how the selected item is to be displayed within the zoomed view.

In some embodiments, once objects are selected by the viewer, they may be stored in the zoom preferences of the viewer. In this way, the client can present the viewer with information such as new recommendations, etc. based on the objects of interest from the viewer's playing history.

Further, prioritization/ranking of objects of interest (e.g., actors in a film, members of a band, etc.) may be retained (e.g., via the viewer preferences) for use in a subsequent viewing situation.

Figure 7:
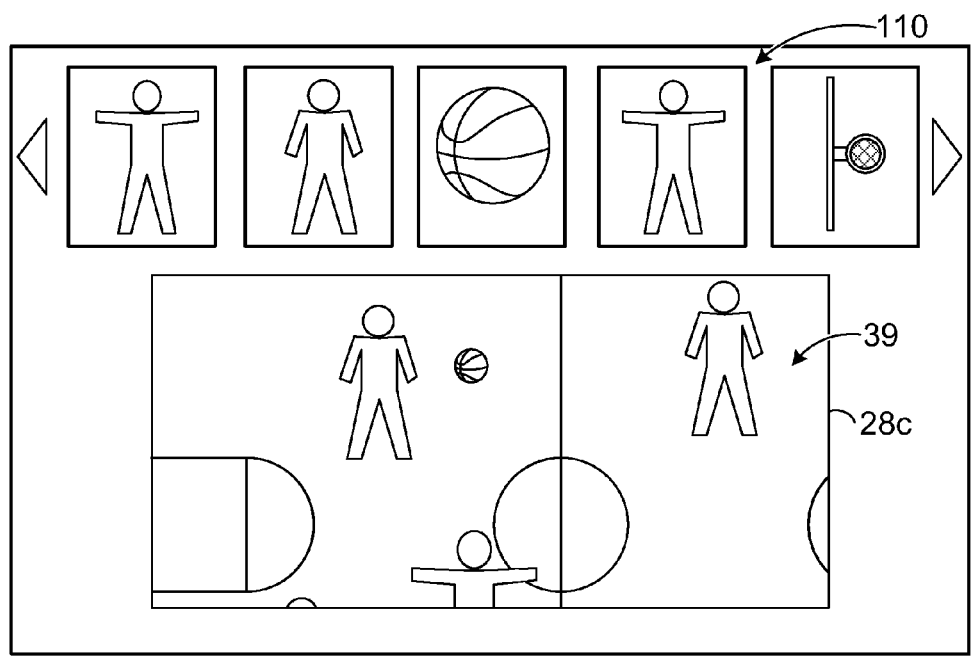
FIG. 7 schematically shows another example of a mosaic view displaying selectable objects in accordance with an embodiment of the present disclosure.

Additionally, adaptive video zoom may be extended from viewing on a constrained device to an augmented multi-screen experience. For example, the viewer may have a set of screens or screen regions on which one screen displays a zoomed or unzoomed stream and other regions display zoomed instances of the top-N identified objects the viewer has chosen. As an example, FIG. 7 illustrates another example of displaying a mosaic view. In this example, a client displays a mosaic view 110 in a first portion of the display, in addition to displaying a zoomed view 39 of content item 28c of FIG. 1 in another portion of the display. In this way, a viewer may select other items throughout the viewing experience to change which object is their object of interest for the zoomed view.

Figure 8:
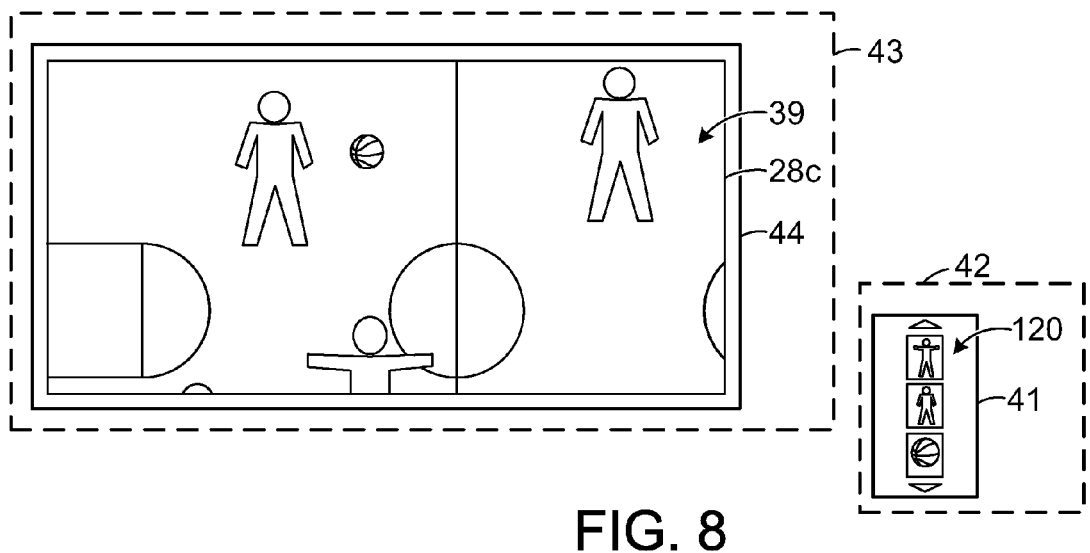
FIG. 8 schematically shows yet another example of a mosaic view displaying selectable objects in accordance with an embodiment of the present disclosure.

As another example, FIG. 8 illustrates an example wherein a mosaic view 120 is displayed on a display 41 of a different client 42 (e.g., a mobile communication device) than the client 43 (e.g., a television) displaying the zoomed view 39 of content item 28c on display 44. In this way, a user may, for example, utilize one client to select which object to view on the other client.

As yet another example, different screens may be utilized to present different zoomed views of the same video content item. In other words, as a possible use scenario, a first zoomed view of a selected object may be displayed based on the zoom preference on a computing device, and a second zoomed view of the video content item may be displayed based on the zoom preference on a companion computing device. As such, a viewer may choose to display a different zoomed view of a same content item on another device. Since the client determines the zoomed view from the metadata received with the video content item, each device may receive the same video content item and metadata, yet display different zoomed views. Thus, in some embodiments each client may display a different zoomed view of the same object of the same video content item.

As another example, each client may select a different selected object from the video content item for the zoomed view, such that each client displays different zoomed views of different objects. For example, as described above with reference to FIG. 1, client 22 may display a zoomed view 34 of a player 36 of video content item 28c, whereas client 24 may display a different zoomed view 38 of the same video content item 28c, but displaying a different player, namely player 40. In this way, a single viewer of both clients may follow the gameplay of the viewer's two favorite players. Alternatively, different viewers of each client may each be able to follow the gameplay of their favorite player. In some embodiments, two or more client devices may communicate with one another and cooperate to present two or more different zoomed views.

The techniques described herein provide identification of objects within visual scenes so as to automatically adjust the zoom window within a video stream. Furthermore possible points of interest may be presented to a viewer in a mosaic view, which may be implemented on a same screen as a main video or on a companion device. The techniques described herein also preserve viewer zoom preferences across different scenes in a particular video stream and/or across different video streams.

Figure 9:
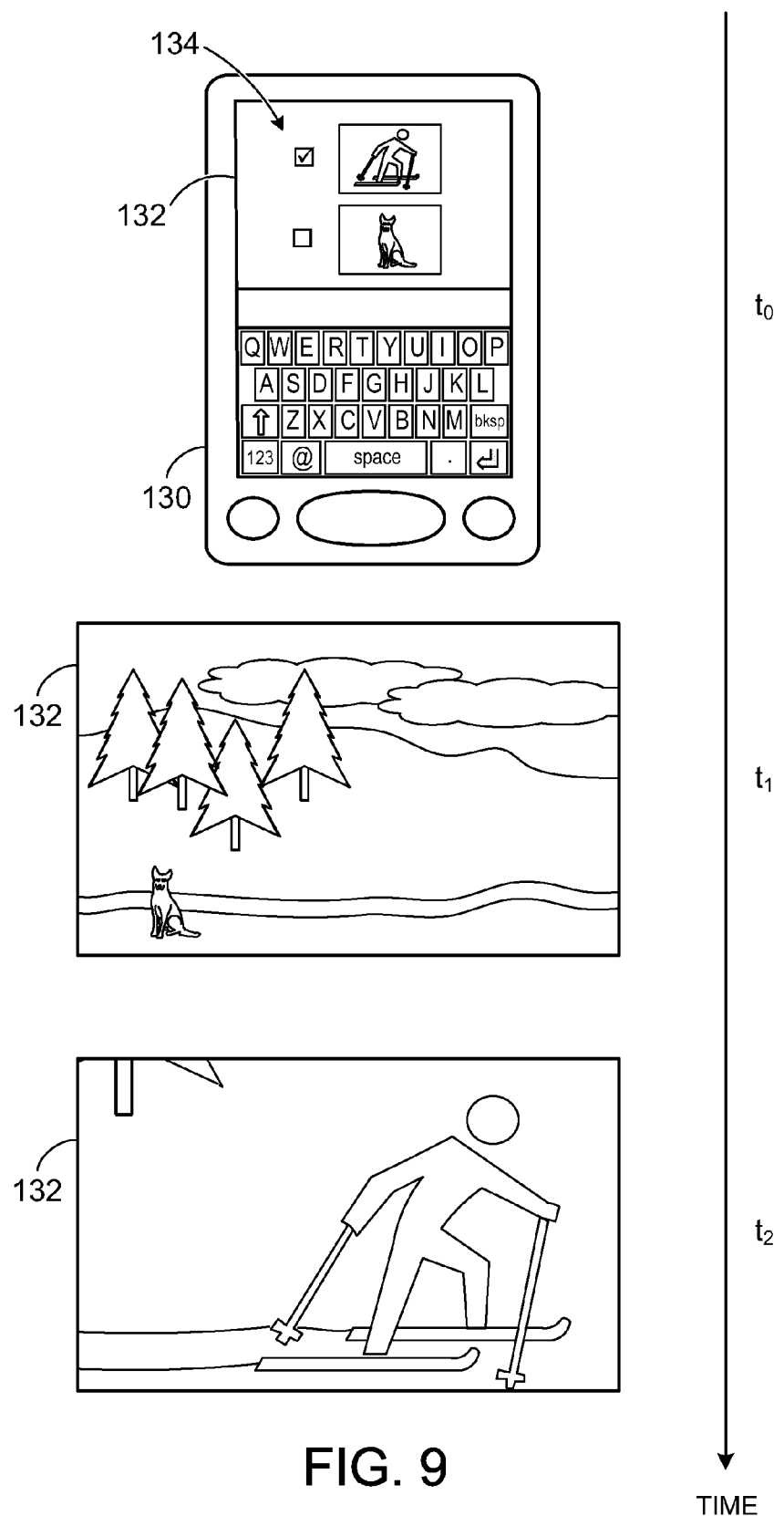
FIG. 9 schematically shows an example use scenario in accordance with an embodiment of the present disclosure.

Turning now to FIG. 9, FIG. 9 illustrates a possible use scenario. In this example, a video player on a client 130 has a screen 132. When beginning a video experience at time $t_0$, before the video begins to play, the viewer may be presented with a list of objects identified from the video, such as shown at 134. In the illustrated example, the list includes images of the objects (e.g., a dog and a skier). The list of objects may additionally or alternatively include information other than images, such as textual descriptions, etc. Upon selecting an item of interest, for example the skier, the video may begin playing, as indicated at subsequent time $t_1$, until one of the selected items appears as described by the video metadata. Once the system encounters a selected item that has a registered window (e.g., the skier), client 130 may automatically zoom the viewing frame to the registered point of interest, as depicted at subsequent time $t_2$.

Figure 10:
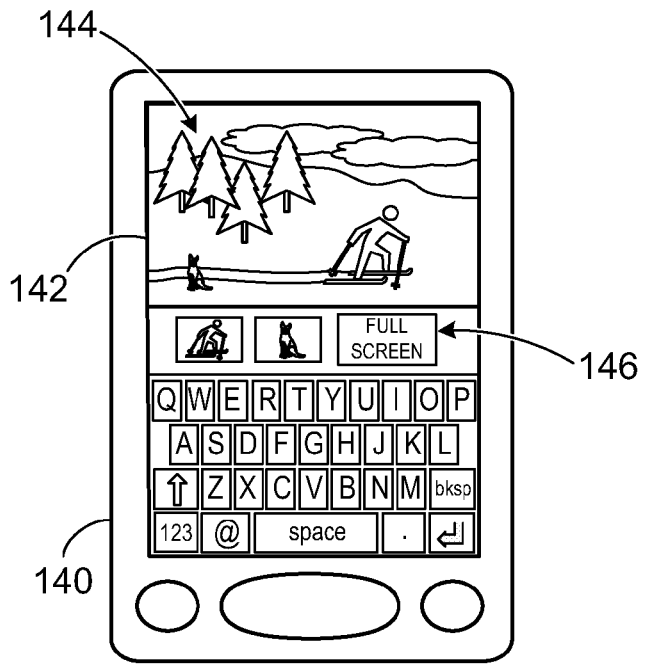
FIG. 10 schematically shows another example use scenario in accordance with an embodiment of the present disclosure.

FIG. 10 illustrates another possible use scenario. In this example, instead of using a separate dialog to display choices for zooming, the client 140 may scale down the playing video within display 142 as depicted at 144, and identify objects of interest available for zooming using the remainder of the screen interface as depicted at 146. In such a case, the viewer could tap or select one of the identified objects to automatically zoom in and then return to the normal view (e.g., via a double-tap input, selection of a "full screen" button, etc).

As yet another possible use scenario, a user interface for zooming may be accomplished using multiple devices for playback. In such a scenario, a group of viewers may be watching a movie at the same time on a large screen of a client computing device. Client companion devices with smaller screens could also play the same video simultaneously and implement zoomed views as described herein. In this way, each smaller device could display a zoomed view of objects for which the viewer has interest, while the regular video continues to display in full screen on the large video device.

Figure 11:
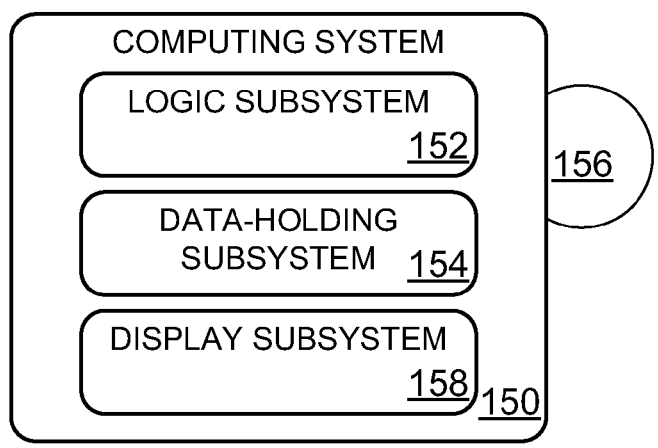
FIG. 11 shows an example computing device in accordance with embodiments of the present disclosure.

In some embodiments, the above described methods and processes may be tied to a computing system. As an example, FIG. 11 schematically shows a computing system 150 that may perform one or more of the above described methods and processes. For example computing system 150 may represent server 32, client 22, client 24, client 130, client 140, etc. Further, in the case of a single computing device being configured to identifying objects and package metadata for a video content item as well as provide zoomed views of the video content item, computing system 150 may represent a computing device comprising server 32 and client 22, a computing device comprising server 32 and client 24, etc.

Computing system 150 includes a logic subsystem 152 and a data-holding subsystem 154. Computing system 150 may optionally include a display subsystem and/or other components not shown in FIG. 11.

Logic subsystem 152 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 154 may include one or more physical, non-transitory, devices configured to hold data and/or instructions executable by the logic subsystem to implement the herein described methods and processes. When such methods and processes are implemented, the state of data-holding subsystem 154 may be transformed (e.g., to hold different data). Data-holding subsystem 154 may include removable media and/or built-in devices. Data-holding subsystem 154 may include optical memory devices, semiconductor memory devices, and/or magnetic memory devices, among others. Data-holding subsystem 154 may include devices with one or more of the following characteristics: volatile, nonvolatile, dynamic, static, read/write, read-only, random access, sequential access, location addressable, file addressable, and content addressable. In some embodiments, logic subsystem 152 and data-holding subsystem 154 may be integrated into one or more common devices, such as an application specific integrated circuit or a system on a chip.

FIG. 11 also shows an aspect of the data-holding subsystem in the form of computer-readable removable media 156, which may be used to store and/or transfer data and/or instructions executable to implement the herein described methods and processes.

A display subsystem 158 may be used to present a visual representation of data held by data-holding subsystem 154. As the herein described methods and processes change the data held by the data-holding subsystem, and thus transform the state of the data-holding subsystem, the state of display subsystem 158 may likewise be transformed to visually represent changes in the underlying data. Display subsystem 158 may include one or more display devices utilizing virtually any type of technology. Such display devices may be combined with logic subsystem 152 and/or data-holding subsystem 154 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of providing a video content item for viewing by one or more viewers, the method comprising:

identifying one or more objects within the video content item;

for each object identified within the video content item, assigning a searchable descriptor for the object;

for each object identified within the video content item, creating a time stamp indicating one or more time periods within the video content item during which the object occurs;

for each object identified within the video content item, creating a bounding window defining a region of the video content item within which the object occurs;

for each object identified within the video content item, packaging the searchable descriptor, the time stamp, and the bounding window into metadata associated with the video content item, the metadata facilitating zoomed viewing of a selected object of the one or more objects within the video content item; and delivering the video content item and the metadata associated with the video content item to a client computing device.

2. The method of claim 1, where the metadata is encoded as part of the video content item.

3. The method of claim 1, where the metadata is a companion file distinct from the video content item.

4. The method of claim 1, where the bounding window for each object indicates a zooming level for displaying the object.

5. The method of claim 1, where a shape of the bounding window for each object is dependent on a shape of the object.

6. The method of claim 1, where the searchable descriptor includes a searchable name.

7. The method of claim 1, where identifying the one or more objects comprises applying a facial recognition algorithm.

8. The method of claim 1, where identifying the one or more objects comprises applying an object recognition algorithm.

9. The method of claim 1, wherein the computing device and the client computing device are of a same computing device.

10. On a client computing device, a method of viewing a video content item, the method comprising:
    receiving a video content item and metadata associated with the video content item, the metadata comprising, for each of one or more objects within the video content item, a searchable descriptor for the object, a time stamp indicating one or more time periods within the video content item during which the object occurs, and a bounding window defining a region of the video content item within which the object occurs;
    accessing a zoom preference of a viewer, the zoom preference indicating one or more objects to zoom during video playback;
    selecting a selected object from the one or more objects by searching the metadata for an object indicated by the zoom preference; and
    displaying a zoomed view of the selected object on a display of the client computing device.

11. The method of claim 10, where the zoom preference includes zoom preferences identified by the viewer.

12. The method of claim 10, where the zoom preference includes learned zoom preferences derived from past viewing habits.

13. The method of claim 10, where the zoom preference is stored locally at the client computing device.

14. The method of claim 10, where the zoom preference is stored at a network-accessible computing device.

15. The method of claim 10, further comprising displaying a mosaic view visually presenting one or more candidate objects to zoom during video playback, and where selecting the selected object comprises receiving selection of a candidate object from the mosaic view.

16. The method of claim 15, where the mosaic view is displayed on a display of the client computing device.

17. The method of claim 15, where the mosaic view is displayed on a display of a companion computing device.

18. The method of claim 10, where searching the metadata comprises searching the searchable descriptor.

19. The method of claim 10, where the zoomed view visually presents the selected object of the video content item based on a bounding window associated with the selected object.

20. A method, comprising:
    receive receiving a video content item and metadata associated with the video content item, the metadata comprising, for each of one or more objects within the video content item, a searchable descriptor for the object, a time stamp indicating one or more time periods within the video content item during which the object occurs, and a bounding window defining a region of the video content item within which the object occurs;
    access accessing a zoom preference of a viewer, the zoom preference indicating one or more objects to zoom during video playback;
    selecting a selected object from the one or more objects by searching the metadata for an object indicated by the zoom preference;
    selecting on a computing device a first zoomed view of the selected object based on the zoom preference; and
    displaying on a companion computing device a second zoomed view of the video content item based on the zoom preference.

* * * * *

UNITED STATES PATENT AND TRADEMARK OFFICE
CERTIFICATE OF CORRECTION

| | |
|---|---|
| PATENT NO. | : 8,331,760 B2 |
| APPLICATION NO. | : 12/792485 |
| DATED | : December 11, 2012 |
| INVENTOR(S) | : Thomas Butcher |

It is certified that error appears in the above-identified patent and that said Letters Patent is hereby corrected as shown below:

In the Specification

In column 4, lines 62-63, delete "indentified" and insert -- identified --, therefor.

Signed and Sealed this
Seventeenth Day of February, 2015

Michelle K. Lee
*Deputy Director of the United States Patent and Trademark Office*